April 25, 1933. W. WINZENBURG 1,905,614
COMBINED CINEMATOGRAPHIC APPARATUS AND BOX
Filed June 20, 1929
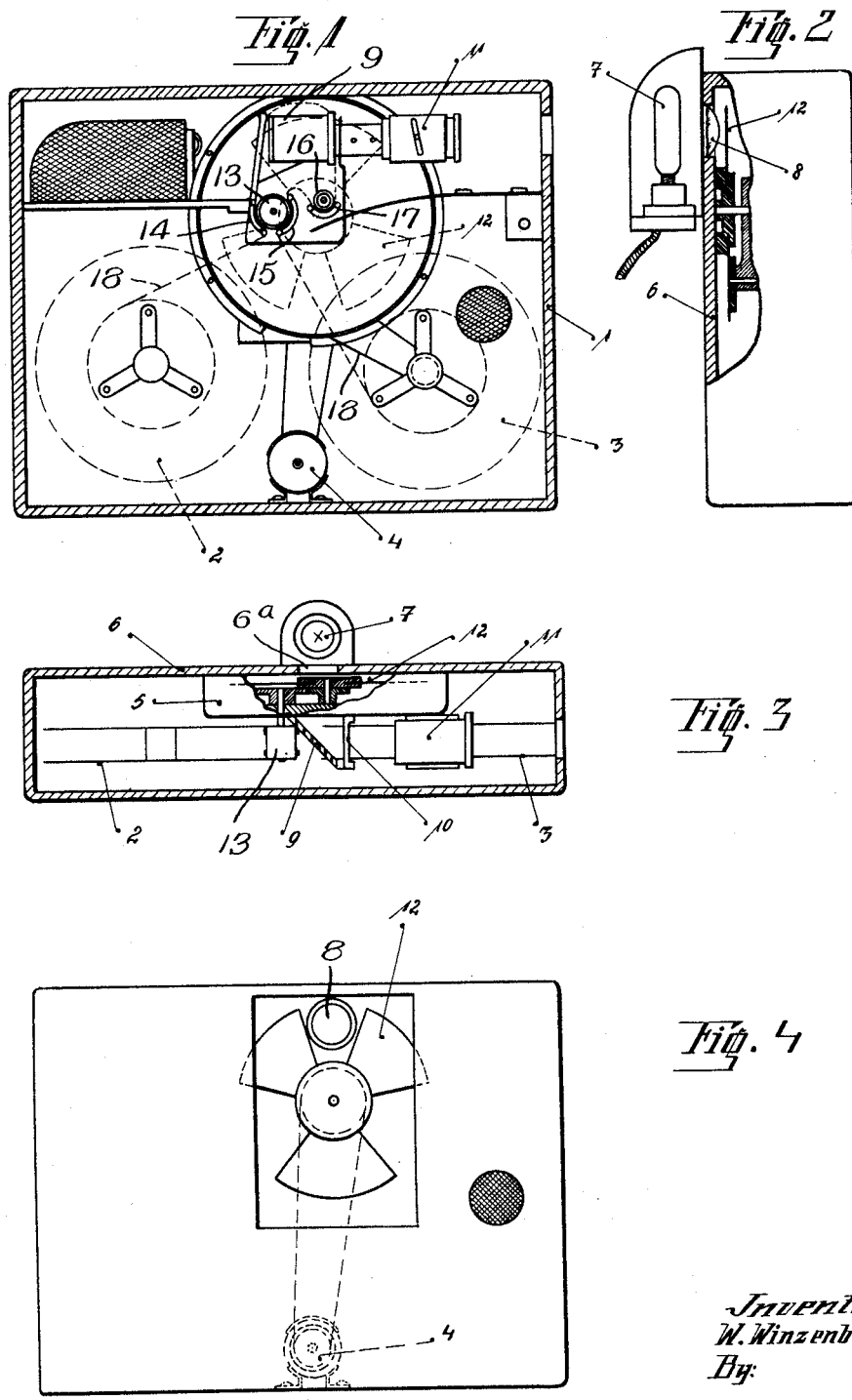

Patented Apr. 25, 1933

1,905,614

UNITED STATES PATENT OFFICE

WILHELM WINZENBURG, OF DRESDEN, GERMANY

COMBINED CINEMATOGRAPHIC APPARATUS AND BOX

Application filed June 20, 1929, Serial No. 372,425, and in Germany February 25, 1928.

This invention relates to the combination of a cinematographic apparatus with a box-shaped casing in such a manner that the entire apparatus can be carried about very conveniently, its casing constituting a box of only moderate size.

I am aware of the fact that cinematographic apparatus resembling boxes in their collapsed state are known. In these known devices the winding-on and the winding-off bobbin are supported on a common axle in order to reduce thereby the size of the box-shaped casing. It has, however, been found that, although the bulk of the box in general is small, still, its breadth is inconveniently large by reason of the infavorable arrangement of said bobbins. It is far more convenient to have a box of small breadth, even if its length is longer than otherwise, its greater length being by no means inconvenient, this being true solely of the breadth.

It has already been tried to obviate the drawback mentioned in the preceding paragraph by providing separate axles for the bobbins and arranging them side by side. The breadth of the casing or box has been reduced by that means, it is true, but not yet sufficiently, the reason being the rotatory shutter which, as is known, cannot have a diameter of any desired smallness.

Now, the object proper of the present invention is to overcome all difficulties encountered hitherto, and I attain the object in view by combining, in a box-shaped cinematographic apparatus having separately supported film bobbins, these bobbins with a cinematographic mechanism in and by which the rays are refracted, and by arranging this mechanism in the box-shaped casing in such a manner that the source of light arranged under an angle with respect to the optical axis is located at one of the sides of the trunk. This arrangement renders it possible to arrange or locate the rotatory shutter parallel to the film bobbins. As now the breadth of the box does no more depend upon the size of the film bobbins and of the shutter disk the trunk can be by far more narrow than hitherto and in addition to this advantage the further advantage is attained that the shutter may be so large as desired and can be tripartite which warrants an excellent reproduction without any flickering.

The invention is illustrated diagrammatically and by way of example on the accompanying drawing on which Figure 1 is a side-view of the interior of a so-called cinematographic box designed according to this invention;

Figure 2 is a frontal view of the box, partly broken away, and the lamp being attached to the box outside the same;

Figure 3 is a horizontal longitudinal section through the cinematographic box, and Figure 4 is a back view of the box, the shutter chamber being open.

On the drawing, 1 denotes the box-shaped casing in which the two film bobbins 2 and 3 are arranged side by side. Between them is arranged the motor 4 by which the mechanism 5 is driven.

This mechanism is attached detachably to the sidewall 6 of the box, and to the same wall, but outside thereof (Fig. 2), is attached detachably the lamp casing 7 with the lamp therein. In the wall 6 is an aperture 6ª. When the lamp 7 is in its position of use, it is located just in front of said aperture. The light rays pass through a condenser lens 8 to a prism or mirror 9, and proceed from this through the gate of the picture stage 10 to the objective 11. Between the lamp and the mirror is arranged the bladed shutter 12 parallel to the film bobbins. When the apparatus is out of use, or in its position of rest respectively, the lamp casing with the lamp can be housed in the free space above the winding-off bobbin 2.

The film band 18 runs from the reel 2 to the reel 3 over a larger pin drum 13 and a smaller pin drum 16 which are rotated with suitable speed by the intermediary of the gearing of the apparatus. The drum 13 is partly surrounded with curved guide members 14 and 15 and the drum 16 is partly surrounded with a curved guide member 17, by which members the film band is kept coupled with said two drums so as to be drawn along by and with them. The film band passes first through between the pin drum 13 and the guide member 14, runs then upwardly to the space above the oblique mirror 9, passes in curved shape through this space, and runs now down along the picture stage 10 and further down to and then around the pin drum 16 at which latter it is guided by the curved guide member 17; now the film passes again over to the pin drum 13 and moves back between it and the curved guide member 15 to the reel 3.

I claim:

1. A portable cinematographic projection apparatus housed in a box, and comprising, in combination with said box, and with an illumination opening in one of the large side-walls thereof; a condensing lens in said opening; a light reflecting member inside the box and opposite the said opening; a rotary bladed shutter between said light-reflecting member and the opening; an objective which is located laterally from the said light-reflecting member and the axis of which is located at right angles with respect to the axis of rotation of said shutter; means for rotating the shutter; two separate film-band reels, the axes of rotation of which lie parallel to the axis of rotation of the said shutter; and a lamp adapted to be attached to and detached from said illuminating opening at the outer surface of the respective large side-wall, the size of the said box being such that in that half of it which lies counter to the objective a space remains above the there located film-band reel in which said lamp can be housed when the apparatus is in portable state.

2. In a portable cinematographic projection apparatus, comprising, in combination with two film band reels located oppositely to one another and a film band running from one of said reels to the other thereof, an objective located opposite the middle portion of the film band between the reels, a light-reflecting member located counter to said objective opposite the other side of the middle film band portion, and means for illuminating this film band portion: a casing enclosing all said members and having in one of its large sides an illuminating opening, the axis of which lies parallel to the axis of rotation of said film band reels, a lens in said opening, a rotary bladed shutter arranged between said lens and said light-reflecting member, means for rotating said shutter, and illuminating means adapted to be attached to, and detached from, said illuminating opening at the outside of said casing.

In testimony whereof I affix my signature.

WILHELM WINZENBURG.